March 25, 1952     J. C. SLONNEGER     2,590,134
INTERNAL-COMBUSTION ENGINE
Filed March 14, 1946     7 Sheets-Sheet 1

INVENTOR.
John C. Slonneger
BY Ahley & Ahley
ATTORNEYS

Fig. 3

INVENTOR.
John C. Slonneger
BY Ahley & Ahley
ATTORNEYS

Fig. 5

March 25, 1952     J. C. SLONNEGER     2,590,134
INTERNAL-COMBUSTION ENGINE

Filed March 14, 1946                        7 Sheets-Sheet 5

INVENTOR.
John C. Slonneger
BY Ahley & Ahley
TORNEYS

Patented Mar. 25, 1952

2,590,134

UNITED STATES PATENT OFFICE 2,590,134

INTERNAL-COMBUSTION ENGINE

John C. Slonneger, Dallas, Tex., assignor to The Continental Supply Company, Dallas, Tex., a corporation of Delaware Application March 14, 1946, Serial No. 654,427

13 Claims. (Cl. 123—195)

This invention relates to new and useful improvements in internal combustion engines.

One object of the invention is to provide an improved engine of the single cylinder type which among other uses is particularly adapted for driving pumping equipment and which possesses features making for longevity and low maintenance.

Another object of the invention is to provide an improved engine wherein the various elements are arranged for simple and ready installation as well as for accessibility.

A further object of the invention is to combine in the engine a simple and efficient lubricating system which not only assures adequate lubrication of the various moving parts, but which reduces to a minimum the number of pipes and couplings; as well as providing a simple and positive means of ascertaining the oil pressure without the use of delicate gauge mechanism.

Still another object of the invention is to provide an engine having improved means for relieving compression to make for easy and ready starting.

A further object of the invention is to provide an improved engine having a governor which maintains a steady throttle, which will produce substantially uniform power strokes and whereby, variations in speed of the engine cause the flywheel to store and give up energy at the right time and substantially at the exact moment and in the required amounts for smooth and satisfactory operation, means being included in the engine for lubricating the governor in a new and novel manner.

Another object of the invention is to provide an engine having an improved governor which is quickly and readily adjusted accurately without tools to any desired speed within its range which is very wide, said governor having substantially the same sensitivity throughout its range and being constructed so as to eliminate trouble caused by dirt and extraneous matter entering the adjusting mechanism.

A still further object of the invention is to provide an engine having improved lubricating oil filler means which effectively seals the crankcase and yet allows the ready addition of lubricating oil while the engine is running or while it is idle, said engine incorporating means for venting the crankcase at proper intervals in the cycle of operation and for preventing loss of lubricating oil through said venting means.

Yet another object of the invention is to provide an engine wherein simple and effective means are furnished for determining the water level in the cooling jacket of the engine while the engine is running or idle, said means allowing the addition of water at any desirable time and providing for the automatic disposal of excessive quantities of water whereby priming of the radiator is eliminated.

A further object of the invention is to provide an engine having an improved oil collecting ring for the crankshaft which is full-floating and substantially free from wear and oil leakages caused thereby.

A construction designed to carry out the invention will be hereinafter described together with other features of the invention.

The invention will be more readily understood from a reading of the following specification and by reference to the accompanying drawings, wherein an example of the invention is shown, and wherein.

Figure 3:
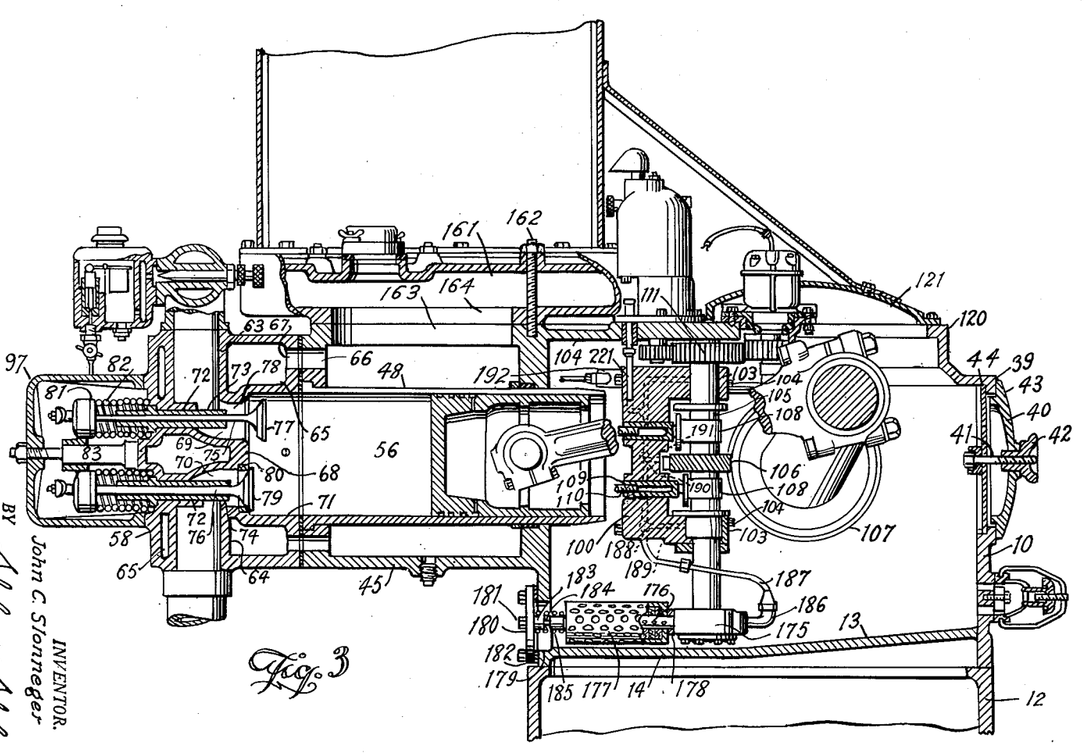
Fig. 3 is a longitudinal sectional view of the engine.
Figure 5:
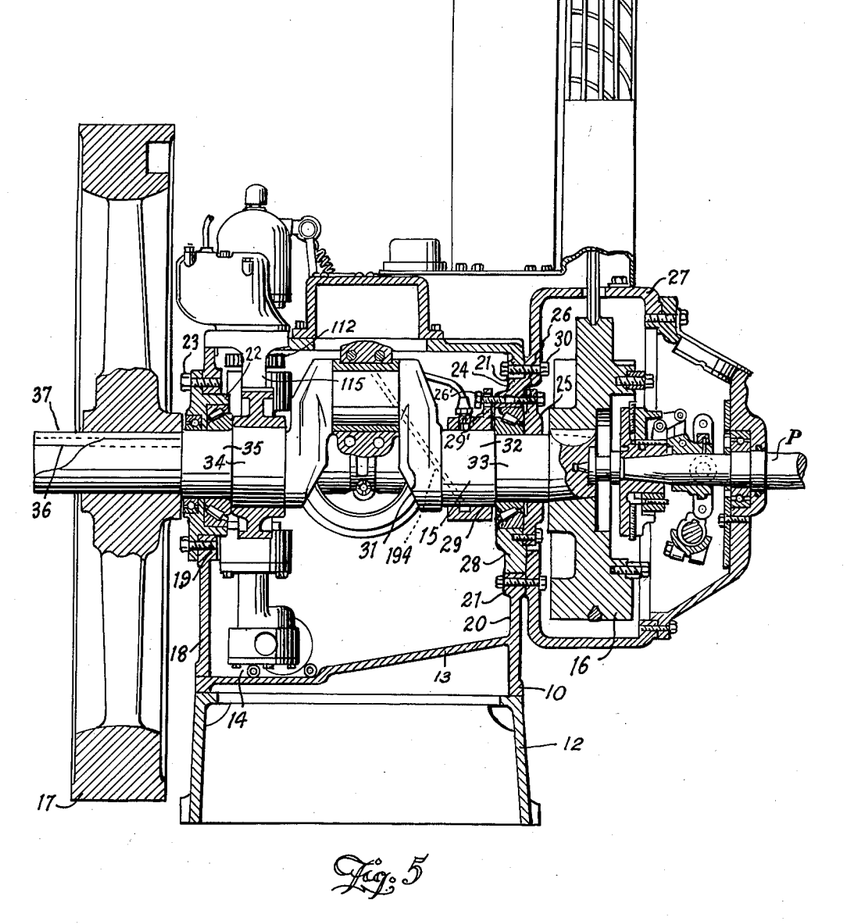
Fig. 5 is a transverse sectional view taken through the vertical plane of the crankshaft.

In the drawings, the numeral 10 designates a hollow crankcase which is provided with external horizontal lugs 11 at its corners whereby the crankcase may be bolted upon a hollow base 12 or secured upon any other support. The crankcase, as is best shown in Figs. 3 and 5, is provided with a false bottom 13 which inclines toward a sump 14 at one side thereof. The crankcase has a crankshaft 15 extending transversely therethrough and connected at one end with a clutch designated generally at 16 on the clutch side of the engine or crankcase. A power take-off shaft P is suitably connected into the clutch mechanism. A flywheel 17 is mounted on the opposite end of the crankshaft on the flywheel side of the engine or crankcase. Flywheels on this type of engines are usually provided with comparatively heavy rims so as to aid in maintaining momentum.

While the crankshaft may be suitably mounted in the crankcase, I prefer to form the wall 18, which is on the flywheel side, with an integral annular collar 19 and to provide the opposite wall 20, which is on the clutch side, with an integral annular collar 21. Although the crankshaft 15 is supported in axially alined bearings, and the collars 19 and 21 are axially alined, they are of different diameters. A roller bearing assembly 22 is secured in the collar 19 by bolts 23.

The clutch 16 includes a cylindrical hollow casing 27. This casing is formed on the inner side of its medial portion with an outwardly offset annular hollow boss 28 which is inserted in the collar 21, and a roller bearing assembly 24 is mounted in this boss. The bearing assembly 24 is confined within the boss by a retaining ring 25 secured on the outer side of the boss by tie bolts 26. An annular lubricant collector 29 is secured against the inner end of the boss in the crankcase by a stud bolt 26' which engages a perforate ear 29' formed on one side of the collector. It will be noted that the opening in the ear 29' is oversize and the head of the bolt 26' does not engage the face of said ear. Thus, the collector 29 is loosely held against rotation only, and is free to move with the crankshaft which it encircles. This structure protects the collector against lateral thrust of the crankshaft which might be caused by wear or misadjustment of the bearing assembly 24, and thereby prevents wear of the collector with the consequent leakage of lubricant. The only load which can be placed on the collector is that represented by its own weight, which is small.

The clutch case 27 is secured to the collar 21 by bolts 30. The crankshaft 15 is provided with the usual crank 31 at its medial portion and is stepped on each side thereof to provide annular bearing faces 32, 33 and 35, respectively, and an annular gear-mounting face 34 on the flywheel side, between the crank and the face 35. The face 32 has a turning fit in the collector 29 while the face 33 is supported in the bearing assembly 24 and extends through the ring 25. The face 35 is supported in the roller bearing assembly 22. Outwardly of the face 35, the end of the crankshaft is provided with a key seat 36 receiving a key 37 whereby the flywheel is secured on said shaft.

The outer end wall 38 of the crankcase is provided with an outwardly-extending annular sleeve 39 which forms a hand-way. A dished cover 40 is attached to the outer end of the sleeve by means of a central bolt 41 and hand nut 42. The head of the bolt is secured in a bar 43 which has either end engaging an annular shoulder 44 within the sleeve, whereby the cover is removably fastened on the crankcase opposite the crankshaft.

Figure 4:
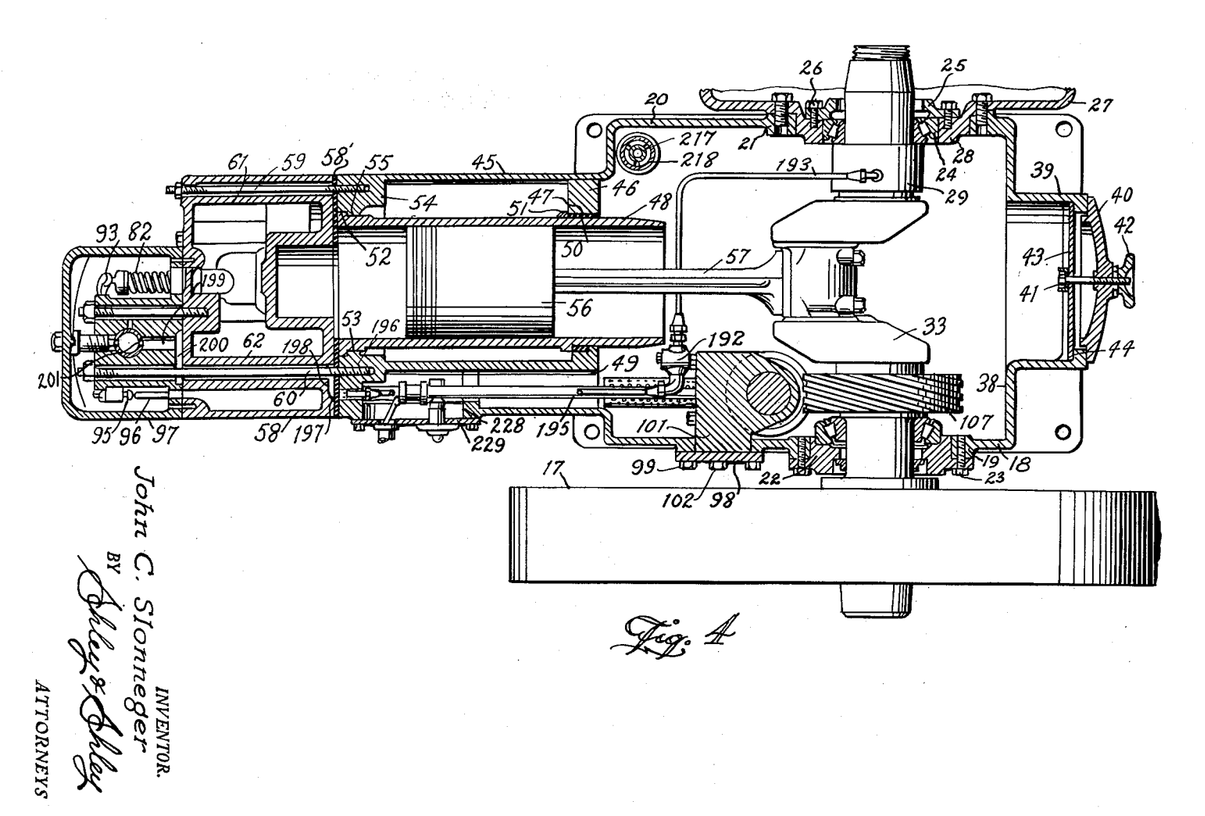
Fig. 4 is a horizontal cross-sectional view of the same.

The inner end of the crankcase is extended to form a cooling jacket 45 which is considerably less in cross-sectional area than the crankcase proper. Near its inner end, the jacket is formed with an internally transverse web 46 which has a cylindrical opening 47 for snugly receiving one end of a piston cylinder or liner 48. The opening 47 is counterbored at 49 to receive a packing ring 50 which snugly embraces the cylinder. The inner end of the cylinder projects slightly into the crankcase as is best shown in Figs. 3 and 4. The cylinder is formed with an annular bead 51 which engages the packing ring 50 and forces it into the counterbore 49 as well as holding it in place. The outer end of the cylinder is provided with an external annular flange 52 and an annular boss 53 extending inwardly from said flange and of less diameter than said flange. At the outer end of the jacket, an annular abutment 54 is formed in the jacket 45 and provided with an annular internal seat 55 complementary to the flange and boss to snugly receive the same. The parts which have been described support the cylinder in proper position to receive a piston 56 connected to the crank 31 by means of a suitable connecting rod 57. The cylinder is removable and may be withdrawn from the jacket for any purpose.

This engine is of the valve-in-head type and, therefore, a cylinder head 58 is mounted on the outer end of the jacket 45 and secured to the abutment 54 by stud bolts 59 and 60. It will be observed that the outer faces of the abutment and cylinder are flush and the inner face of the head is likewise flush so that a head gasket 58' may be secured therebetween to form a fluid-tight joint. The head 58 is generally hollow and provided with passages and ducts, which will be hereinafter described. The bolts 59 and 60 extend loosely through sleeves 61 and 62, respectively, within the head and made integral therewith. The head 58 is cast with a vertical intake duct 63 in its upper portion and a vertical exhaust duct 64 in its lower portion. These ducts are spaced from the vertical walls of the head so as to provide a circulating space 65 therearound, as is common in this art, and this space communicates with ports 66 in the abutment 54 through ports 67 in the face of the head. A coolant supplied to the jacket 45, may thus circulate through the head. The inner ends of the ducts 63 and 64 are made integral with a valve block indicated generally by the numeral 68. The inner ends of the ducts merge into inwardly-directed elbows or passages 69 and 70 (Fig. 3). These passages communicate with an annular cylinder chamber 71 formed integral with the head 58 and alined with the cylinder 48.

The valve block 68 is formed with transverse counterbored openings 72 at the inner ends of the ducts for receiving flanged bushings 73 for valve stems 75 and 76 respectively. An intake valve 77 fastened on the inner end of the stem 75 engages an annular seat 78 at the inner end of the passage 69; while an exhaust valve head 79 engages an insert seat 80 countersunk in the inner end of the passage 70. The valve 77 controls the intake of fuel to the cylinder; while the valve 80 controls the exhaust from the cylinder. The outer ends of the valve stems carry collars 81 and coil springs 82 are confined between these collars and the bushings in the usual manner; such springs being under sufficient tension to hold the valves on their seats.

Figure 7:
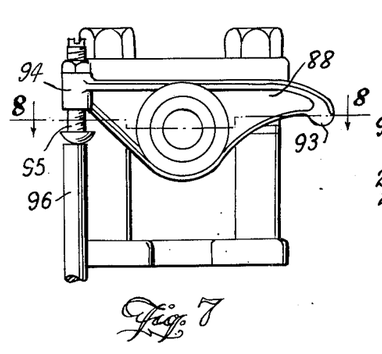
Fig. 7 is a detail of one of the rocker arms and the mounting therefor.
Figure 8:
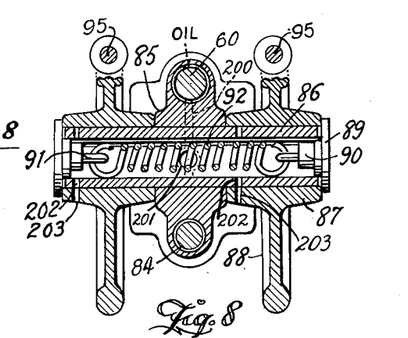
Fig. 8 is a horizontal cross-sectional view taken on the line 8—8 of Fig. 7.

A split rocker bracket 83 is removably secured on the outer end of the head 58 and held in place by the bolt 60 which passes through one side thereof and at its opposite side, by a bolt 84 (Fig. 4) which is screwed into the head. This bracket is formed with an integral and enlarged bearing collar 85 through which a tubular rocker shaft 86 extends. The shaft is clamped in the collar and on each side of the collar the hubs 87 of a pair of rocker arms 88 are rotatably mounted, as shown in Figs. 7 and 8. These arms are retained on the shaft by cap plugs 89 bearing against the ends of the shaft and having stepped shanks 90 which carry hooks 91 connected with the ends of a coiled springs 92, which latter acts to hold the caps in engagement with the ends of the tubular shaft.

Each rocker arm carries a curved rocker 93 at one end and an integral tappet sleeve 94 at its opposite end. The rockers 93 engage the upper ends of the valve stems 75 and 76 in the usual manner for depressing the same, and this particular structure is not an essential part of the invention. In each tappet sleeve, a tappet pin 95 of the usual construction is adjustably mounted for operation by push rods 96. A cover housing 97 is removably mounted on the head for enclosing the rocker mechanism.

One of the important features of the invention resides in the camshaft and lubricating unit which is mounted in the crankcase and includes a hanger block 100. This block is disposed vertically on the flywheel side and attached to a cover plate 98 secured on the vertical wall of the casing by bolts 99, whereby an opening 101 is left in the side wall. The inner face of the plate 98 is machined to provide a proper mounting for the block 100, and the obtaining of such a mounting is the reason for utilizing the mode of structure, the machining of an interior wall of the crankcase being undesirable. The block is attached to the cover plate by bolts 102. At each end of the block, solid bearing boxes 103 are fastened by bolts 104. A camshaft 105 is journaled in these boxes and a pinion 106 fastened on the medial portion thereof. This pinion is driven by a gear 107 fastened on the face 35 of the crankshaft 15. The gear and pinion are of the spiral type and are disposed in planes at right angles to each other.

On each side of the pinion and between the boxes, cams 108 are provided and the throws of these cams are disposed in the proper angular adjustment for actuating valve lifters 109 attached to the push rods 96 which extend through the jacket 45 and engage the tappets 95 on the ends of the rocker arms 88 and thus, when the crankshaft is revolved, rotation is imparted to the gear 107 and pinion 106, whereby the camshaft is rotated and the rocker arms 88 are actuated to alternately depress the inlet and exhaust valves.

Figure 6:
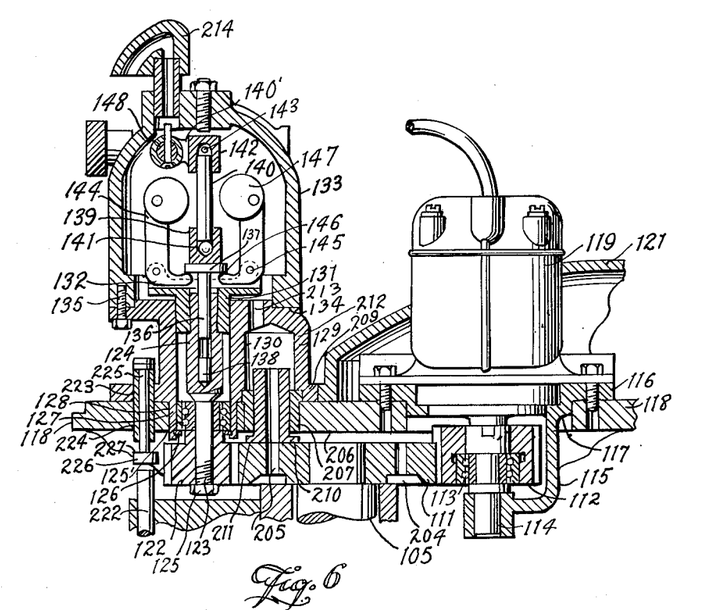
Fig. 6 is a transverse sectional view of the governor and magneto mounting.

The camshaft 105 extends from the upper end of the block and has fastened thereon a gear 111. This gear drives a magneto pinion 112 as is shown in Fig. 6. The pinion 112 is disposed horizontally and mounted on a ball bearing assembly 113 carried by a shaft 114 supported in a depending bearing bracket 115 which forms part of a magneto base 116 which is bolted in an opening 117 on the top wall 118 of the crankcase. A magneto 119 which may be of any approved construction is secured on this base, and is connected to a suitable spark plug S mounted in one wall of the head 58. The top wall 118 of the crankcase is provided with an opening 120 which is closed with a dome-shaped cover 121 to allow proper clearance for the throw of the crankshaft.

Diametrically opposite the pinion 112, the gear 111 meshes with a governor pinion 122. This pinion is fastened on the reduced shank 123 of a tubular governor shaft 124 by means of a nut 125. At the intersection of the shank and the tubular portion of the governor shaft, a horizontal ball bearing assembly 125' is provided for rotatably supporting said shaft. The bearing assembly is mounted in a collar 127 and held in place by a retaining ring 126. The collar fits in a circular opening 128 formed in the top plate 118 of the crankcase and depends from the bottom of a governor base 129 which is bolted on said top plate. The governor shaft is enclosed within a sleeve 130 formed at one side of the base and integral therewith. The upper end of the shaft is reduced and has fastened thereon a bearing collar 131 which rotates in the upper end of the sleeve and extends thereabove. A transverse grooved bracket 132 is made integral with the upper end of the collar.

A dome-shaped governor housing 133 is secured in an annular recess 134 in the top of the housing by means of bolts 135. The shaft 124 terminates below the upper end of the collar 131 and receives a vertically slideable plunger 136. This plunger carries a thrust disk 137 on its upper end. The lower end of the plunger carries a piston 138 which has a loose sliding fit in the bore of the tubular governor shaft. The piston operates in an oil bath which lubricates the plunger and damps its action. A cylindrical cup 139 is mounted axially of the plunger on the disk 137 and receives the lower end of a detent 140 which rests upon a ball 141 in said cup. The upper end of the detent engages in an inverted cup 142.

Since the governor shaft 124 is rotatable, the collar 131 and the bracket 132 are likewise rotatable; the bracket rotating in the lower portion of the governor housing and the plunger 136 being slideable therethrough. Angular governor arms 144 are mounted in the grooved ends of the bracket on pins 145 and have inwardly-directed fingers 146 which engage between the disk 137 and the bottom of the bracket. Weights 147 disposed on the upper ends of the arms overhang the fingers and tend to swing the arms toward the detent 140. The governor arms work in the usual manner, whereby the weights are displaced outwardly as the speed of rotation increases, whereby the plunger 136 is elevated which carries the cup 139 and the detent 140 upwardly.

The upper cup 142 is pivoted by a pin 143 to an arm 143' formed on one side of an operating shaft 148 which is journaled in bearing sleeves 149 extending through bosses 150 in the upper portion of the housing 133. The operating shaft extends through one side of the housing and has clamped thereon a crank arm 151. This crank arm has spaced ears 152 and 153 at its upper horizontal end in which a spiral shaft 154 is journaled. A knurled knob 155 is fastened on one end of the shaft for rotating the same. A coiled spring 156 has its lower end engaged over a stud 157 on the exterior of the governor base 129. The upper end of the spring is formed into a hook 158 which is engaged in the spiral groove 159 of the shaft 154.

It will be observed that when the governor shaft 124 is revolved and the arms 144 displaced outwardly, the disk 137 will be lifted, and consequently the detent 140 and cup 142 will swing the arm 143' whereby the operating shaft 148 will be rocked which, in turn, will rock the crank arm 151. By this arrangement, the amplitude of the swing of the long leg of the crank will be controlled by the centrifugal action of the governor. Further, it will be seen that the tension of the spring 156 exerts a downward pull or force not only upon the crank, but upon the plunger 136 through the elements connected therebetween. The pull of the spring 156 is reflected in leverage determined by the spacing of the hook 158 from the shaft 148 on which the crank is fastened. If the knob 155 is turned to move the hook 158 closer to the shaft 148, this leverage is reduced, but if the rotation of the shaft is reversed to move the spring hook outwardly, then the leverage is increased; also as the hook 158 is moved outwardly on the shaft, the spring will be adjusted at an increasing angle to the perpendicular, and therefore, its tension will be increased. The lower end of the crank 151 is pivotally connected to a throttle rod 159' which is suitably attached to the throttle of a carburetor 160 mounted on the cylinder head and connected with the intake passage 63 in the usual manner. The carburetor may be of any desirable type and structure.

The forces exerted by the centrifugal action of the governor and the extension of the spring 156 seek a balance. An increase in speed will raise the plunger 136 and if this occurs suddenly, a partial vacuum will be produced below the piston 138 because of the comparatively slow by-passing of the oil balance confined in the governor shaft. This vacuum, of course, slightly retards the action of the governor and momentary slight overspeeding may result. If the increase in speed is maintained, the plunger will be further elevated as the oil completely fills the bore below the piston and thus relieves the force of the partial vacuum of the plunger. Now if the speed should be suddenly decreased, the plunger can move downwardly only as rapidly as the unbalanced force acting downward causes the piston to by-pass the oil trapped thereunder. By controlling the clearance between the piston and the bore of the governor shaft, the rate at which the oil by-passes is regulated and thus, upon the downward motion of the plunger, a greater retarding or damping action may be obtained than during the upward motion thereof. It is, of course, understood that the governor is so connected to the throttle of the carburetor that an upward motion of the plunger 136 causes the throttle to move toward a closed position and upon a downward movement of the plunger, to move toward an open position. In view of the foregoing, it is pointed out that because of the damping or retarding action, the throttle may be closed quickly, thereby preventing the engine from overspeeding, but the throttle cannot be opened as rapidly. In all speed changes, the piston 138 exerts a damping action to steady the speed of the engine.

Where the engine is used with a comparatively rapidly fluctuating load, as for instance where an oil well pump is being driven, the damping action has the effect of producing substantially no movement of the throttle valve, since the governor assumes substantially an average position due to the fact that the governor does not react to momentary speed changes, as will be obvious from the foregoing description. Should the average load be definitely changed, the spring and governor weights will slowly assume a new average position to maintain balance, but it is pointed out that if the change of load or speed is of short duration, there may be substantially no change in the position of the throttle. In ordinary governors, the mechanism is so constructed that a sudden reduction in speed will cause the governor weights to collapse, which will result in a sudden opening of the throttle. However, the damping action herein described avoids this condition and the throttle will open in a comparatively even and steady manner. It is pointed out that the sensitivity of the governor is not impaired by this oil damper. On the contrary, the arrangement of the spiral shaft 154 and spring 156 provides for very accurate adjustment as to speed which the governor will maintain under rapidly fluctuating loads.

The knob 155 provides a convenient means for adjusting the governor for predetermined speeds and such adjustment provides for a very broad speed range. As has been before pointed out, this is due to the leverage effect of the spring 156 on the crank 151. By this arrangement, a wide range of speed adjustments may be accomplished and the sensitivity proportionately maintained.

To provide for cooling the engine, a flat tank 161 is secured on the jacket 45 by means of bolts 162. In the upper side of the jacket, an opening 163 registers with an opening 164 in the bottom of the tank, and thus a coolant such as water is supplied to the jacket and may flow therefrom through the openings 66 and 67 into the cylinder head 58 wherein it may circulate through the passages 65. A suitable vented radiator 165 is mounted on the tank and provided with a fan (not shown) enclosed in a guard 166 for drawing air through the radiator and cooling the same. The details of the cooling system are not essential to the engine, except as herein pointed out.

In the horizontal type of engine, steam or vapor cooling readily adaptable. However, one of the difficulties has been the determination and maintenance of a proper water level in the system. If the water level is too high, a boiling turbulence will cause the water to be thrown into the radiator tubings and result in priming. Too low a level will cause overheating. The agitation of the water renders the ordinary means of determining the true water level unreliable. The common practice has been to determine the water level after the engine has been stopped and boiling has ceased. Obviously, it is unsatisfactory and impractical to stop the engine to check the water level.

Figure 1:
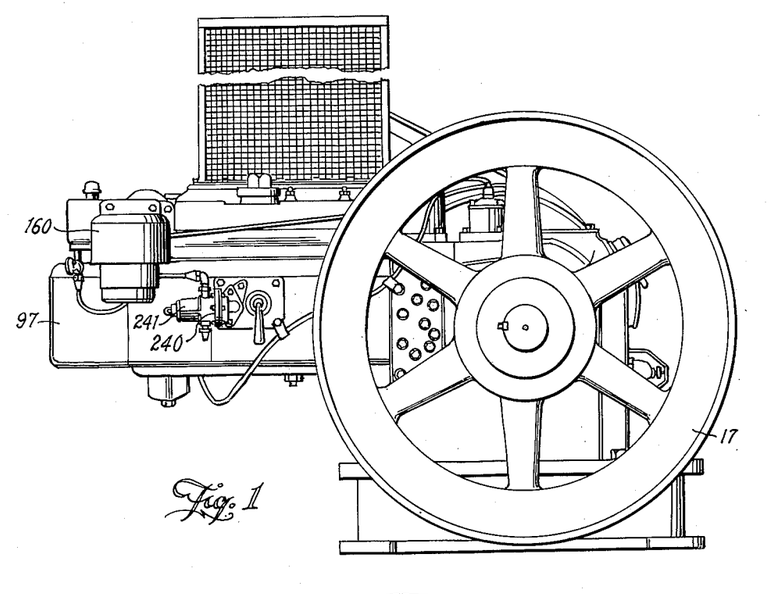
Fig. 1 is a side elevation of an engine constructed in accordance with the invention.
Figure 2:
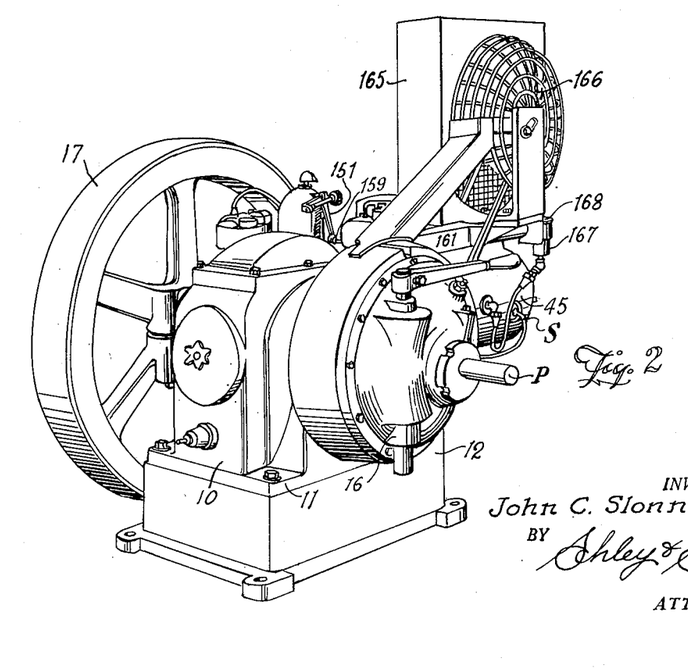
Fig. 2 is an isometrical view of the same, taken from the side opposite to that shown in Fig. 1.

To overcome this difficulty, I attach to the outside of the tank 161 (Fig. 2) a cup 167 having a loose fitting lid 168 which while held closed by a spring hinge 169, is nevertheless nonsealing. The cup has a reduced depending tubular portion 170 into the bottom of which a 45° elbow 171 is fastened. An elbow 172 is screwed into the side of the jacket 45 on substantially the plane of the transverse axis of the engine piston 56 which is substantially the medial portion of said jacket. A U-shaped tube 173 is suitably connected with the elbow 172 and the upper end of the tube is merged into an extension 174 which is suitably connected with the elbow 171. It is obvious that the water level in the jacket 45 will be the same as the water level in the tubes 173, 174 and the cup 167 since both the radiator and the cup are vented to the atmosphere. The cup is of such length that its lower end corresponds to the minimum level of the water in the jacket which is deemed safe for operation, while the top of the cup is at such an elevation that it corresponds to the highest water level that may be maintained without causing objectionable surging of the steam or vapors in the radiator tubes.

It will be apparent that so long as water appears in the cup, the engine may be safely operated so far as its cooling is concerned. An abnormal rise in the water level due to expansion or displacement by steam above the level of the top of the cup or by the addition of excessive amounts of water to the cooling system will cause the water to overflow the cup since the lid 168 is not sealed. Because of the inertia of the column of water in the tube 173, variations in pressure due to the turbulence of boiling will not cause objectionable movement of water in the cup. One purpose of forming the tube in a U-shape is to prevent thermosyphonic circulation of the water between the jacket and the cup. Since water is a comparatively low conductor of heat, such water as remains in the cup will be comparatively cool, thus preventing water loss by excessive evaporation or the loss of antifreeze solution when the same is used. Water may be added by pouring the same into the cup when the engine is running or when the engine is idle. The cup and the radiator being vented to the atmosphere, the vapor pressure in the cooling system never exceeds that of the atmosphere.

The lubricating system of this engine is designed and constructed to be as efficient and yet as simple as possible, with a minimum of oil lines and feeders, the basic parts of the engine being utilized to conduct the lubricating oil rather than separate pipes. The lower end of the camshaft 105 is extended and connected to a suitable oil pump 175 positioned near the bottom of the crankcase and having its inlet pipe 176 arranged to pick up lubricating oil from the sump 14. A suitable screen or filter 177 which may be of any desirable type, has a sliding fit over the inlet pipe 176 and engages a gasket 178 disposed at the inner end thereof. The filter, of course, serves to prevent dirt and foreign matter from entering the pump 175 and the balance of the lubricating system. To allow ready servicing and replacement of the filter 177, an opening 179 is formed in the vertical wall of the crankcase adjacent the end of the filter, and is adapted to be closed by a plate 180 held by suitable machine screws 181. A gasket 182 seals the joint between the plate 180 and the crankcase wall. The plate is provided with a centrally-located boss 183 on its inner face and a stud bolt 184 is secured therein. The bolt 184 has a close sliding fit within an opening in the outer end of the filter and has a nut secured to its inner end whereby the filter is slideably secured to the plate 180. A coiled spring 185 is compressed between the plate and the filter so that when the plate is in place, the filter is urged inwardly into engagement with the gasket 178. Obviously, removal of the plate 180 allows the quick and easy removal of the filter through the opening 179 for cleaning or replacement.

The pressure outlet 186 of the oil pump 175 is connected by a pipe 187 to the lower end of an axial oil passage 188 formed in the block 100. Lateral passages 189 communicate with the passage 188 and direct lubricating oil onto the bearing surfaces of the camshaft 105. An oil relief valve 190 is mounted in the medial portion of the block 100 so as to communicate with the passage 188. The valve 190 is of the usual adjustable spring-loaded type and discharges through an opening 191 directed through the block 100 toward the pinion 106 secured on the camshaft. Thus, oil passing through the valve is caused to flow upon the pinion 106 and thereby lubricate this pinion and the gear 107 disposed on the crankshaft.

An oil outlet fitting 192 is mounted in the upper end of the block 100 and has connected in one side thereof an oil pipe 193 extending through the crankcase to the oil collector ring or collar 29. The face 32 is provided with an opening 194 which extends through the crankshaft in the usual manner to provide lubrication for the connecting rod bearing and the bearing face 35. If desired, oil may also be conducted to the wrist-pin bearing of the connecting rod.

A second oil pipe 195 extends outwardly from the fitting 192 and connects into an opening 196 formed in the abutment 54 and registering with a similar opening 197 in the gasket 58'. A milled groove 198 extends laterally of the sleeve 62 so as to communicate with the opening 197, whereby lubricating oil may flow from the pipe 195 through the openings 196 and 197 and the groove 198 to the annular space around the bolt 60, and thus to the outer end of the head 58. The gasket 58' effectively seals this connection.

It is pointed out, that the sleeve 62 is surrounded by the water jacket wherein a temperature approaching 212° F. exists. Thus, the sleeve acts as a heat exchanger to warm the oil flowing therethrough and thereby maintain a higher oil temperature throughout the lubricating system. In engines of this type, and especially in colder climates, this result is desirable since oil temperatures usually are too low for efficient lubrication.

The bracket 83 is formed with a passage 199 extending inwardly from the bore of the collar 85, and a groove 200 communicating between the upper end of the collar 62 and the passage 199 to lubricate said bore. The tubular rocker shaft 86 is provided with central radial openings 201, whereby oil under pressure may enter the bore of said shaft and be conducted thence to openings 202 formed in each end of the shaft. Ports 203, similar to the openings 202, are formed in the hubs 87 of the rocker arms 88, and are so positioned as to register with the openings 202 when the valves 77 and 79 are in open positions. The ports 203 are so directed as to throw a stream of oil on the exposed portions of the valve stems whereby efficient lubrication is maintained. Thus, intermittent lubrication of the valve stems, and continuous lubrication of the rocker arms and the rocker arm shaft is assured.

It is pointed out, that this lubricating system for the valve and rocker arms does not require the use of separate oil lines which are subject to damage and leakage, and possibly may be incorrectly connected by a person working on the engine, or not connected at all. The oil lines form an integral part of the rocker bracket and the cylinder head and are removed and replaced when these elements are.

The crankcase is vented in a manner which prevents loss of oil by breathing and at the same time lubricates the governor mechanism. The venting structure is best shown in Fig. 6 of the drawings. The gear 111 fastened on the upper end of the camshaft 105 is formed with a concentric groove 204 in its lower face and diametrically-opposed openings 205 extending upwardly therefrom through the gear. Obviously, the openings 205 are in communication at all times with the crankcase. An opening 206 is provided in the top wall 118 of the crankcase immediately above one side of the circular path traveled by the openings 205 so as to alternately register with said openings as the gear 111 rotates.

A bushing 207 has a close fit in the opening 206. The bushing carries an annular flange 208 on its upper end so as to support the bushing within the opening and engages within a recess 209 formed in the lower face of the governor base 129, whereby the bushing is securely held. A nipple 210 rests upon the upper face of the gear 111 and rides within the bushing, the lower end of the nipple being flanged to prevent its upward displacement through the bushing. Normally, there is space between the flange and the bushing, the close fit between the latter and the nipple preventing leaks therebetween. An enlarged chamber 212 is formed in the base 129 above the recess 209 and a port 213 communicates between the chamber and the interior of the governor housing 133. The upper end of the governor housing is vented to the atmosphere through a suitable vent cap 214.

As the engine is operating, the movement of the piston within the cylinder will cause a variation in volume and a consequent variation in pressure within the crankcase. As the gear 111 rotates, the openings 205 will come into alternate register with the nipple 210 and thus vent to atmosphere through the governor housing. As air, with entrained oil, passes through the nipple and enters the enlarged chamber 212, and again as it enters the enlarged interior of the governor housing, its velocity is reduced and the oil flung out against the wall of the governor housing by the governor weights so as to return to the crankcase via the space around the shaft 124 and the nipple. This oil serves to lubricate the governor mechanism, and to some extent to replenish the oil within the oil damper of the governor.

The openings 205 are so spaced on the gear 111 as to register with the nipple 210 when the piston is at bottom dead center. The total opening and closing period represents about 30° of crankshaft rotation so that during the major portion of a cycle the vent is closed, and the crankcase is under partial vacuum whereby the return of oil from the governor housing is aided.

Figures 9, 10, 12:
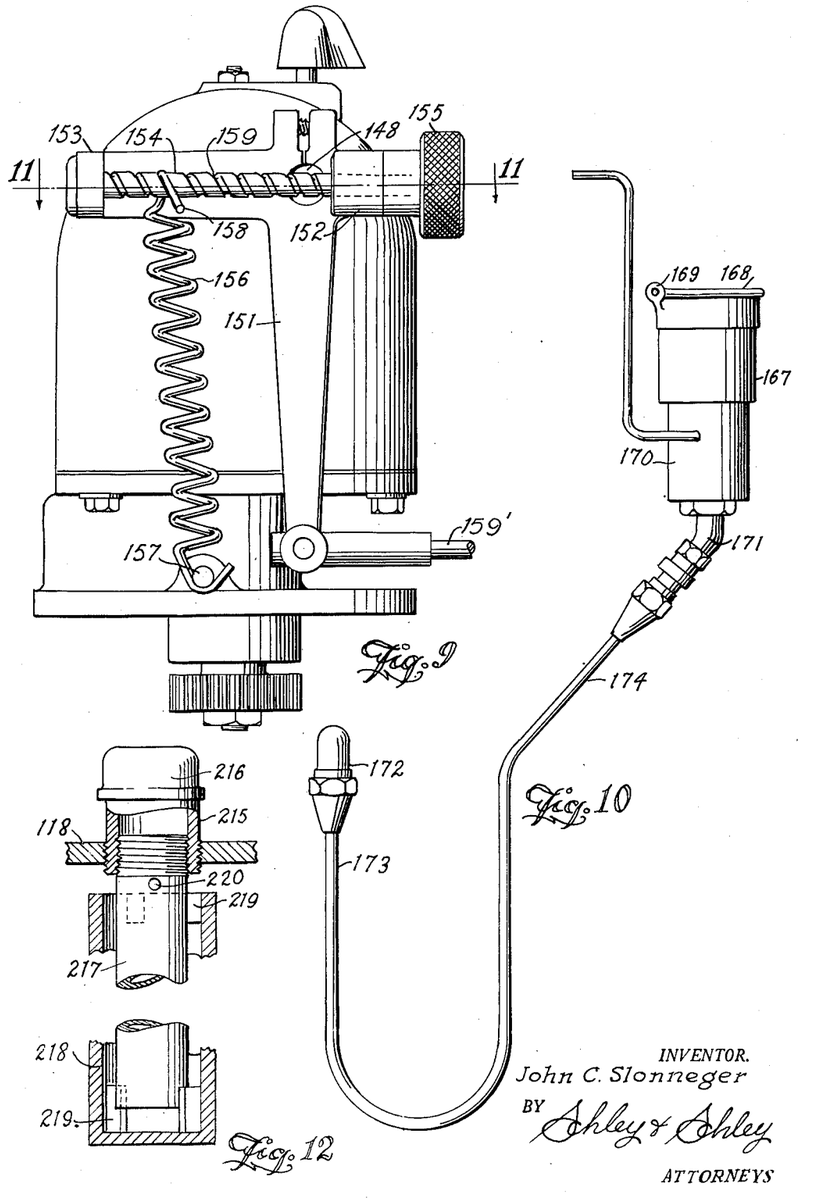
Fig. 9 is an enlarged side elevation of the governor showing the regulating means.
Fig. 10 is an enlarged side elevation of the water filling assembly.
Fig. 12 is a view partly in elevation and partly in section of the oil filler assembly.
Figures 11, 16:
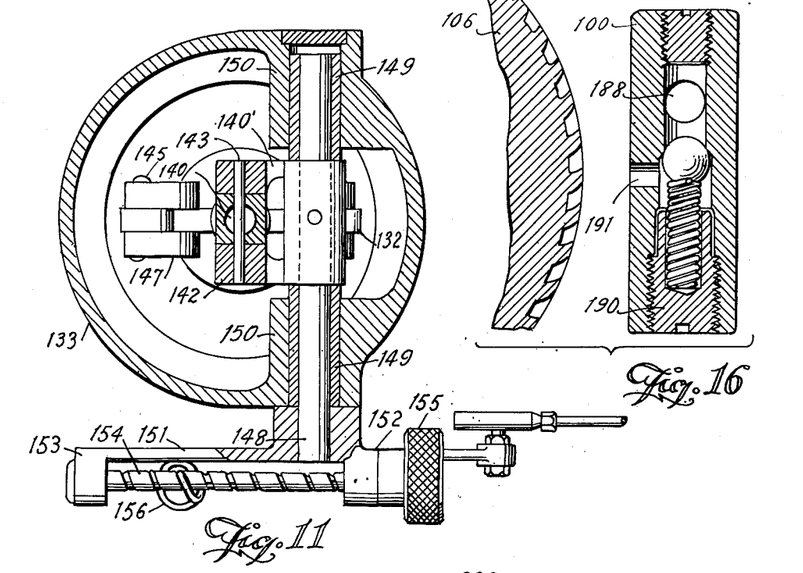
Fig. 11 is a horizontal cross-sectional view taken on the line 11—11 of Fig. 9.
Fig. 16 is a horizontal, cross-sectional view of the center portion of the camshaft block, showing the oil pressure relief valve.
Figure 13:
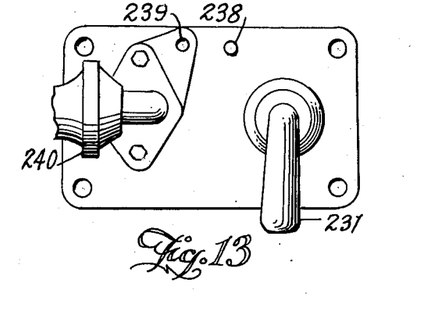
Fig. 13 is an elevation of the fuel pump mounting plate, showing the compression releasing lever.

A special assembly is utilized for adding lubricating oil to the crankcase. This assembly is shown in Fig. 12, and is positioned vertically in one corner of the crankcase as is shown in Fig. 4. The assembly comprises a collar 215 secured in the top wall 118 of the crankcase and adapted to be closed by a suitable cap 216. An elongate nipple 217 extends downwardly from the collar, while a sleeve 218, having its lower end closed, telescopes the nipple 217 and has its open upper end disposed a short distance below the top wall 118. Spacers 219 are positioned in the annular space between the nipple and the sleeve at the top and bottom thereof, and being welded or otherwise suitably secured to both elements, serve to secure them together as well as space their sidewalls.

Lubricating oil, upon introduction into the collar 215, flows downwardly through the nipple and then, as additional oil is added, upwardly through the annular space between the nipple and the sleeve 218 until it overflows the upper end of the sleeve and enters the crankcase. The oil will flow thus until the head in the nipple equals the head in the sleeve. Oil will remain in the annular space so that an oil seal is established which effectively seals the crankcase and allows the addition of oil while the engine is running or while it is idle. The turbulence and splashing of oil, normal in the crankcase of an engine in operation, is not communicated to the oil filler pipe so that oil may be readily added, and air may not be drawn into the crankcase because of the oil seal.

It has been found that in actual operation at a fairly uniform speed, the oil columns within the nipple and sleeve tend to fluctuate due to variable pressures within the crankcase, and such fluctuations reach amplitudes at times sufficient to splash most of the oil into the crankcase whereby the oil seal is lost. To prevent this occurrence, a small hole 220 is formed in the wall of the nipple 217 above the upper end of the sleeve 218 so that pressure equalization may take place. The hole 220 is small so that air breathed into the crankcase is kept at a minimum.

An improved means for determining oil pressure has been provided. The upper end of the block 100 is formed with an upwardly-extending passage 221 communicating with the passage 188, and counterbored to receive a cylindrical plunger 222, which has a sliding fit within the counterbore. Since the oil pressure exerted by the oil pump is directed against the lower end of the plunger, the plunger will react to such pressure to move longitudinally within the counterbore. A bushing 223 is secured within an opening 224 formed directly above the plunger in the top wall 118 of the crankcase and the flanged base 129 of the governor unit. A feeler rod 225 has a sliding fit within the bushing and is provided with flanged caps 226 at either end to retain the rod within said bushing. The lower cap is adapted to be engaged by the plunger 222 so as to move the rod upwardly as the plunger moves thus. A packing ring 227 is confined on the inner side of each of the caps 226 so as to seal the space between the rod 225 and the bushing 224 when the rod is in its upper or lower position.

When the engine is in operation, the pressure exerted by the oil pump forces the plunger 222 and thus the rod 225 upwardly. Manual pressing down of the feeler rod must overcome this pressure, and thus will indicate to the operator the amount of oil pressure being developed. This pressure gauge is reasonably accurate, and is almost entirely free from susceptibility to damage due to accidents or vibration or rough treatment. An ordinary pressure gauge is not protected from this damage, and on engines which have been in use for some time, may usually be found to be broken or damaged, or so lacking in accuracy as to be useless.

Thus, an entire lubrication system is provided which is simple, trouble-free and wherein means are provided to safeguard against normal mistakes and rough treatment caused by operating personnel. In this connection, it is pointed out that the connection of the camshaft 105 directly to the oil pump 175 substantially eliminates the possibility of an oil system failure independent of a general engine failure. So long as the camshaft operates, the oil pump will be driven, and should the camshaft fail, the engine would stop. So damage due to oil system failures are minimized.

It has been the practice heretofore to provide some means in hand-cranked engines for relieving the cylinder head pressure due to compression during cranking. These means usually consist of a mechanism for holding the exhaust valve open until sufficient flywheel speed is attained to carry the engine through one or two cycles. The objection to this method is that it fills the cylinder with air, which of course, must be flushed out by a burnable mixture after the valve is released and an effort made to start the engine.

I prefer to relieve compression by holding the intake valve open so that the cylinder is filled with a burnable mixture during the initial cranking period and more efficient starting is obtained.

To accomplish this desirable result, an opening 228 is provided in the flywheel side of the jacket 45 in the portion of the jacket through which the push rods operate, and is adapted to be closed by a cover plate 229. An opening 230 is formed in the inner end of the plate. A suitable handle 231 has an integral shank 232 projecting through the opening and carrying an eccentrically mounted pin 233 on its inner end. A collar 234 is pressed or otherwise secured upon the pin adjacent the inner face of the plate 229 so that outward movement of the handle and pin assembly is prevented. The pin is adapted to engage the inner end of a spool 236 secured to the intake valve push rod 96, and is formed with an annular groove 235, semi-circular in cross-section, intermediate its ends, said groove being of sufficient depth as to allow proper clearance for the push rod. The spool 236 is cylindrical and carries annular flanges 237 at either end.

Figure 14:
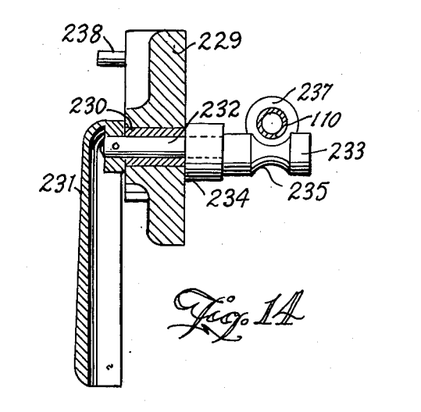
Fig. 14 is an enlarged vertical, sectional view showing the position of the lever with respect to the intake valve push rod.
Figure 15:
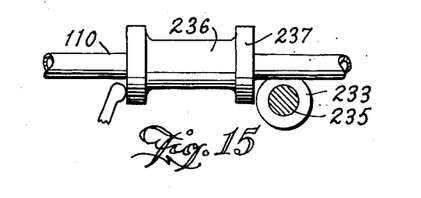
Fig. 15 is a partial view in elevation of the spool secured on the intake push rod for engagement by the lever.

When the handle 231 is in its downward position, as shown in Fig. 14, the pin 233, due to its eccentric mounting, is in a lowered position and not in contact with the spool 236. The groove 235 provides clearance sufficient for the reciprocating movement of the push rod 96 normal during engine operation. The spool is so positioned as to clear the pin during such movement. However, in starting the engine, counter-clockwise movement of the handle will cause the pin to move upwardly into engagement with the spool and outwardly so as to force the push rod outwardly thereby actuating the rocker arm 88 and opening the intake valve 77. To hold the handle in this position, it is allowed to swing a little past top dead center so as to rest against a pin 238 projecting outwardly from the plate 229. A slight toggle action is achieved in this manner, whereby return of the handle to its downward position is prevented until such movement is accomplished manually. Of course, after sufficient cranking speed is attained, the handle is swung downwardly to allow normal starting of the engine.

The plate 229 carries an opening and a mounting 239 at its outer end for receiving a fuel pump 240 which may be of any desirable type, although a diaphragm pump is normally used on this type of engine. The pump may, of course, include a fuel filter 241. The actuating lever 242 of the pump projects through the opening in the plate 229 into the interior of the jacket 45 and is engaged by the outer flange 237 of the spool 236 secured to the intake valve push rod. Thus, reciprocation of the push rod imparts motion to the lever 242 to actuate the fuel pump during operation of the engine.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An internal combustion engine including, a crankcase, a crankshaft mounted in the crankcase, a cylinder extending from the case having a piston therein connected with the crankshaft, said crankcase having an opening in one side wall, a plate secured over the opening, a hanger block secured and supported upon the portion of the plate exposed through the opening, and a camshaft rotatably carried by the block and rotatably connected with the crankshaft.

2. An internal combustion engine as set forth in claim 1, wherein the camshaft extends substantially vertically within the crankcase, and an oil pump connected directly to the lower end of the camshaft.

3. An internal combustion engine as set forth in claim 2, wherein the hanger block is provided with a longitudinal oil passage leading from the pump, and an excessive oil pressure relief valve carried by the hanger and communicating with the oil passage thereof, the relief valve having its discharge adjacent to and directed at the camshaft.

4. An internal combustion engine as set forth in claim 1, wherein the outer surface of the crankcase adjacent the opening is machined smooth, and the inner face of the plate is machined smooth to provide an accurate surface upon which the hanger block is secured and supported.

5. An internal combustion engine including, a crankcase, a crankshaft mounted in the crankcase, a cylinder extending from the case having a piston therein connected with the crankshaft, said crankcase having an opening in one side wall, a plate secured over the opening, a hanger block secured upon the portion of the plate exposed through the opening, spaced bearings carried by the hanger block, a camshaft rotatably mounted in the bearings, a driven gear on the camshaft, and a driving gear on the crankshaft meshing with the driven gear, the hanger block having a longitudinal oil passage and branch oil passages leading from the longitudinal passage to the bearings and the driven gear.

6. An internal combustion engine as set forth in claim 5, and an oil pressure relief valve in the branch passage leading to the driven gear.

7. An internal combustion engine including, a crankcase, a crankshaft mounted in the crankcase, a cylinder extending from the case having a piston therein connected with the crankshaft, a hanger block detachably connected to the wall of the crankcase, a camshaft rotatably carried by the hanger block, a driving connection between the crankshaft and the camshaft, valve lifters carried by the hanger block, the block having a longitudinal oil passage and branch oil passages leading from the longitudinal passage to the driving connection, the valve lifters, and the camshaft for lubricating the same.

8. An internal combustion engine as set forth in claim 7, and an oil pressure relief valve in the branch oil line leading to the driving connection.

9. An internal combustion engine as set forth in claim 8, and an oil pump connected directly to one end of the camshaft with its outlet communicating with the longitudinal oil passage of the hanger block.

10. An internal combustion engine including, a crankcase, a crankshaft mounted in the crankcase, a cylinder extending from the case having a piston therein connected with the crankshaft, a hanger block detachably connected to the wall of the crankcase, bearings carried by the hanger block, a camshaft rotatably carried by the hanger block bearings, a driving connection between the crankshaft and the camshaft, valve lifters carried in the hanger block, the block having a longitudinal oil passage extending therethrough and branch oil passages leading from the latter to the bearings, means for conducting lubricant from the longitudinal passage to the valve lifters, an oil pump connected to one end of the camshaft with its outlet communicating with the longitudinal oil passage of the hanger block, and an oil pressure relief valve carried by the block in communication with the longitudinal passage and having its discharge adjacent to and directed at the driving connection.

11. An internal combustion engine including, a crankcase, a crankshaft mounted in the crankcase, a cylinder block with a cylinder therein extending from the case, a piston in the cylinder connected with the crankshaft, a cylinder head having a coolant jacket removably secured to the cylinder block, a first oil passage formed integrally with the cylinder head extending through the coolant jacket in heat exchange relationship, a second oil passage formed integrally with the cylinder block and in communication with the first passage for conducting oil thereto, an oil pump in the crankcase, and oil conducting means leading from the oil pump to the second oil passage.

12. An internal combustion engine including, a crankcase, a crankshaft mounted in the crankcase, a cylinder block with a cylinder therein extending from the case, a piston in the cylinder connected with the crankshaft, a cylinder head removably secured to the cylinder block and having a portion abutting said cylinder block, a rocker arm support removably secured to the cylinder head and having a portion abutting said cylinder head, a first oil passage formed integrally with the support and extending from the portion thereof abutting to the cylinder head, a second oil passage formed integrally with the cylinder head and extending from the portion thereof abutted by the rocker arm support to the portion thereof abutting the cylinder block said second oil passage being in communication with the first passage for conducting oil thereto, a third oil passage formed integrally with the cylinder block and extending to the portion thereof abutted by the cylinder head, said third oil passage being in communication with the second passage for conducting oil thereto, an oil pump in the crankcase, and oil conducting means leading from the oil pump to the third oil passage.

13. A horizontal internal combustion engine including, a crankcase, a crankshaft mounted horizontally across the crankcase, a cylinder extending horizontally from the case having a piston therein connected with the crankshaft, a cylinder head removably secured upon the cylinder, valves in the cylinder head, a rocker arm support removably secured upon the cylinder head, rocker arms carried by the support and engaging the valves, push rods engaging the rocker arms and extending parallel to the cylinder, a hanger block in the crankcase, a vertical camshaft rotatably carried by the hanger block having valve lifter cams thereon, valve lifters carried by the hanger block and engaging the cams and the push rods, an oil pump connected directly to the lower end of the camshaft, a governor geared to the upper end of the camshaft, a magneto geared to the upper end of the camshaft, a driving gear on the crankshaft, and a driven gear on the camshaft meshing with said driving gear.

JOHN C. SLONNEGER.

REFERENCES CITED

The following references are of record in the file of this patent:

UNITED STATES PATENTS

| Number | Name | Date |
|---|---|---|
| 977,885 | Laviolette | Dec. 6, 1910 |
| 1,161,225 | Koken et al. | Nov. 23, 1915 |
| 1,178,586 | Lapointe | Apr. 11, 1916 |
| 1,254,780 | Davison | Jan. 29, 1918 |
| 1,338,722 | Fekete | May 4, 1920 |
| 1,430,524 | Kettering | Sept. 26, 1922 |
| 1,459,563 | Thamm | June 19, 1923 |
| 1,549,339 | Van Balkom | Aug. 11, 1925 |
| 1,554,350 | Jack | Sept. 20, 1925 |
| 1,626,364 | Starr | Apr. 26, 1927 |
| 1,627,761 | Woolson | May 10, 1927 |
| 1,731,823 | McCuen | Oct. 15, 1929 |
| 1,743,586 | Wiltse | Jan. 14, 1930 |
| 1,801,953 | Caminez | Apr. 21, 1931 |
| 1,874,489 | Frederick | Aug. 30, 1932 |
| 1,900,968 | Woolson | Mar. 14, 1933 |
| 1,915,283 | Bechman | June 27, 1933 |
| 2,000,635 | Edwards | May 7, 1935 |
| 2,137,482 | Gil | Nov. 22, 1938 |
| 2,201,525 | Fedden et al. | May 21, 1940 |
| 2,226,596 | Swenson | Dec. 31, 1940 |
| 2,288,831 | O'Harrow | July 7, 1942 |

FOREIGN PATENTS

| Number | Country | Date |
|---|---|---|
| 106,964 | Great Britain | June 4, 1919 |